United States Patent

[11] 3,624,717

| [72] | Inventor | Richard K. Brubaker<br>Warren, Mich. |
|---|---|---|
| [21] | Appl. No. | 9,354 |
| [22] | Filed | Feb. 6, 1970 |
| [45] | Patented | Nov. 30, 1971 |
| [73] | Assignee | Eaton Yale & Towne Inc.<br>Cleveland, Ohio |

[54] AXLE SHAFT RETENTION SYSTEM
7 Claims, 5 Drawing Figs.

[52] U.S. Cl. ................................................. 74/711,
74/713, 85/8.6, 287/108
[51] Int. Cl. ................................................. F16h 1/44,
F16h 1/40, F16b 21/09
[50] Field of Search ......................................... 74/711,
710.5, 710, 713; 85/7, 8.9, 8.6; 287/130, 108

[56] References Cited
UNITED STATES PATENTS
1,205,883  11/1916  Gay ..............................  85/7

| 1,823,753 | 9/1931 | Muhlfeld .................... | 85/8.9 |
|---|---|---|---|
| 2,647,294 | 8/1953 | Davis ........................... | 85/8.9 X |
| 2,839,809 | 6/1958 | Warner et al. .............. | 85/7 X |
| 3,224,299 | 12/1965 | Holdeman et al. ........... | 74/711 |
| 3,397,595 | 8/1968 | Roach ......................... | 74/710.5 |
| 3,400,611 | 9/1968 | Engle .......................... | 74/710.5 |
| 3,527,120 | 9/1970 | Duer et al. .................. | 74/711 |

Primary Examiner—Carlton H. Croyle
Assistant Examiner—Thomas C. Perry
Attorney—Teagno & Toddy ABSTRACT: A differential drive mechanism having a housing includes a pair of oppositely extending rotatable shafts. The shafts are coaxial and have spaced ends. A keyed element cooperates with the shafts to maintain said shafts within the housing and to prevent excessive axial movement thereof with respect to the housing. The keyed element also is effective to exert a biasing force on side gears within the housing to bias said side gears into engagement with clutch plates when said keyed element is used in a limit slip differential type mechanism.

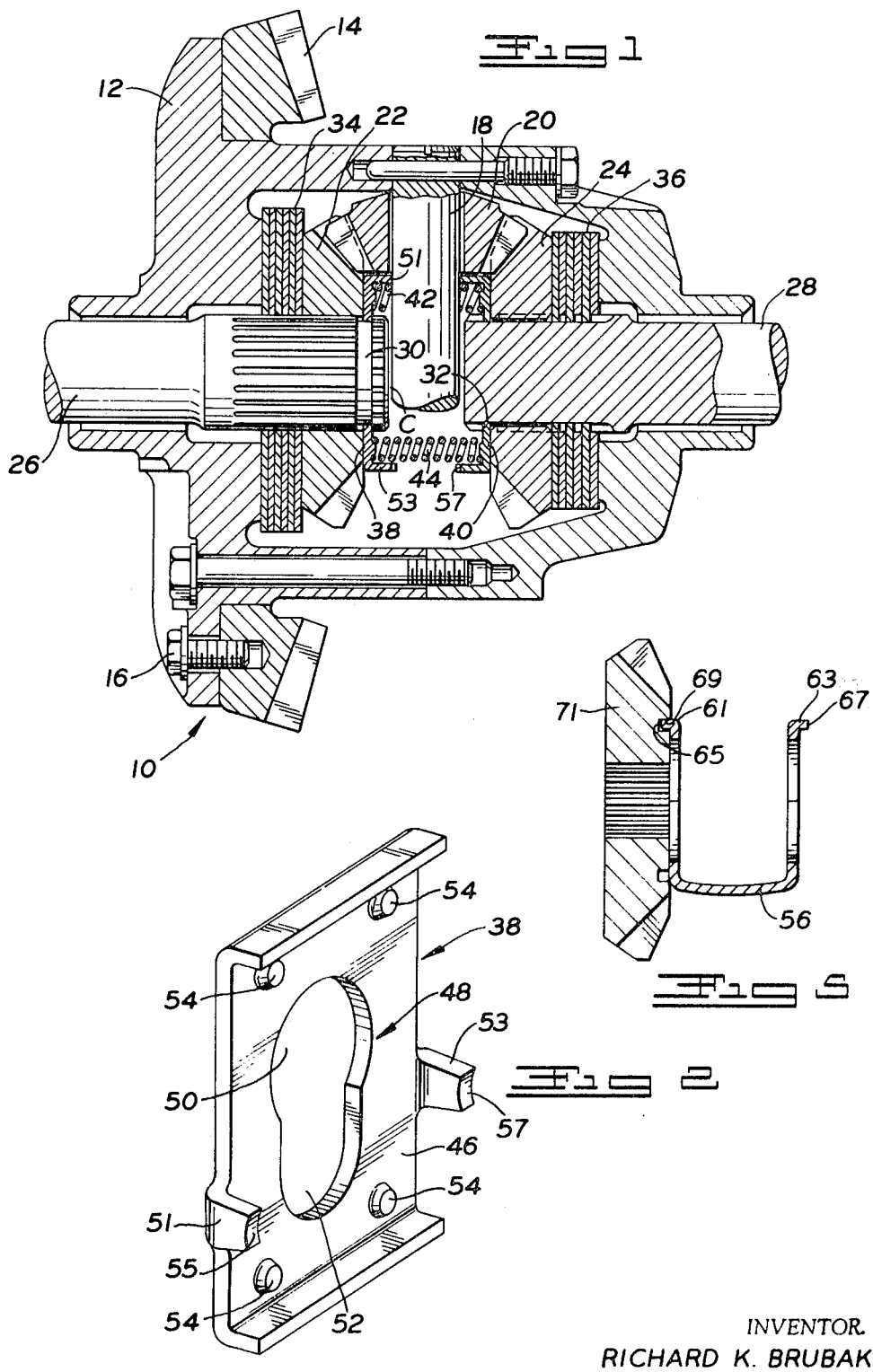

PATENTED NOV 30 1971

INVENTOR.
RICHARD K. BRUBAKER
BY Teagno & Toddy
ATTORNEY

AXLE SHAFT RETENTION SYSTEM

BACKGROUND OF INVENTION

1. Field of Invention

This invention relates to an axle shaft retention device generally and more particularly to an axle shaft retention device which permits simplified assembly of an axle shaft with a differential mechanism.

2. Discussion of the Prior Art

Certain prior art differential drive mechanisms have included concentric, oppositely extending, rotatable axle shafts having circumferential grooves near the spaced ends thereof within the differential case. The axles are restrained against withdrawal from the differential case by keying devices cooperating with the grooves and engaging a part within the differential case such as a side gear. U.S. Pat. No. 3,400,611 issued Sept. 10, 1968 to J. F. Engle is illustrative of the prior art of this type. In a limited slip differential, it is conventional to normally bias the slide gears of the differential into engagement with a clutch mechanism acting between the differential case and an axle shaft so that differentiation is possible by slipping the clutch at relatively low differential torque levels. At high differential torque levels, the pinion gears exert high force loadings on the side gears and further bias the side gears into engagement with the clutch and differentiation is prevented. The beneficial application of limited slip differentials in vehicles is well known.

One of the problems associated with a limited slip differential is that of assembling the axle retainers and side gear biasing means into an assembled differential. The assembly problems may be readily seen by reference to FIG. 1 of Engle, U.S. Pat. No. 3,400,611.

SUMMARY OF THE INVENTION

The invention of the present application serves to apply the initial bias on the clutch and facilitates assembly of limited slip differentials and comprises a retention device having a keyhole opening therein; one portion of said opening permitting passage of the axle shafts therethrough and another portion of said opening cooperating with a circumferential groove in the axle shaft to prevent excessive axial movement of the axle shaft. The retention device further includes means for applying a biasing force to the differential side gears so as to properly bias the limited slip differential clutch into operating condition.

Having thus briefly described the invention of the present application and its relationship to the prior art, reference will now be made to the drawing and accompanying description for a complete illustration and explanation of a preferred embodiment of the present invention.

BRIEF DESCRIPTION OF THE DRAWING

FIG. 1 is a cross-sectional view of a conventional limited slip differential including a preferred embodiment of the invention of the present application.

FIG. 2 is a perspective view of a portion of a preferred embodiment of the present invention.

FIG. 5 is a cross-sectional view of the embodiment of FIG. 3 shown in the assembled position.

DETAILED DESCRIPTION OF A PREFERRED EMBODIMENT

Figure 3:
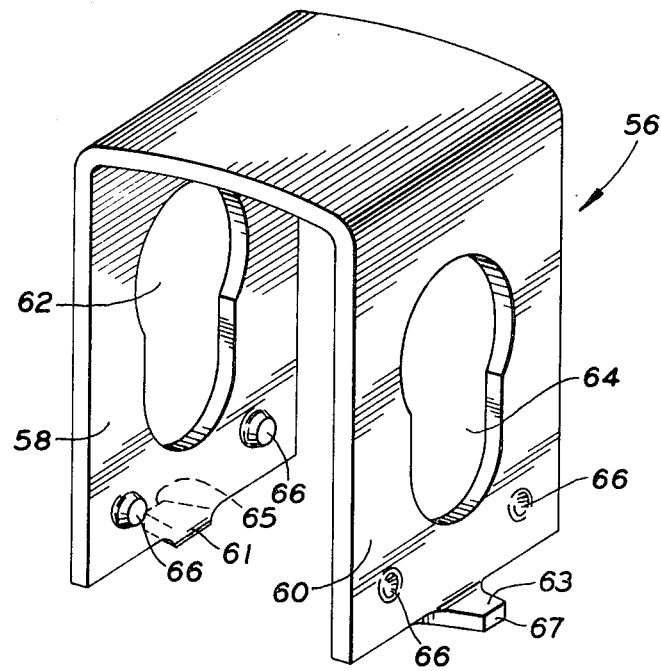
FIG. 3 is a perspective view of an alternate embodiment of the present invention.

The invention of the present application is particularly adapted for use in a conventional slip differential, illustrated generally in FIG. 1 by the reference numeral 10. The differential comprises a generally cylindrical differential case 12 adapted to be rotatably mounted within a differential housing, not shown, and driven through a main drive line pinion and a ring gear 14, the main drive line pinion being rotatably supported by the differential housing and the ring gear 14 being secured to the differential case 12 by suitable fastening means 16, all as is well known in the art. Fixedly mounted within the differential case 12 is a pinion shaft 18 extending transverse to the axis of rotation of the differential case 12. Rotatably mounted on the pinion shaft 18 is a pinion gear 20 which is adapted to be driven by the differential case through the pinion shaft 18 at the rotational velocity of the differential case 12. The pinion gear 20 engages a pair of side gears 22 and 24 and will cause the side gears 22 and 24 to be driven at the same rotational velocity as the differential case 12. A pair of oppositely extending coaxial axle shafts 26 and 28 are provided to cause rotation of the vehicle drive wheels. The side gear 22 is nonrotatably secured to the shaft 28. The connection between the side gears 22 and 24 and the shafts 26 and 28 respectively is by means of a splined connection so that a limited amount of axial movement of the side gears 22 and 24 with respect to the shafts 26 and 28 is permitted while providing a nonrotatable connection therebetween. The shafts 26 and 28 are provided with circumferential grooves 30 and 32 respectively near the ends thereof. Located between the respective side gears 22 and 24 and the differential case 12 are disc clutch packs 34 and 36 which are nonrotatably mounted on the shafts 26 and 28 respectively for rotation therewith. The function of the disc clutch packs 34 and 36 are to provide the limited slip characteristics of the differential 10 by limiting the differentiation due to excessive inequalities in the torque being transmitted by one or the other of the shafts 26 and 28, all as is well known and understood in the art.

Also shown in FIG. 1 and comprising the invention of the present application is a pair of retention devices 38 and 40 which cooperate with the circumferential groove 30 and 32 of the shaft 26 and 28 respectively in a manner to prevent the withdrawal of the shaft 26 and 28 from the differential case 12 when properly positioned within the grooves 30 and 32. Biasing means in the form of springs 42 and 44 are provided between the retention devices 38 and 40 to exert a force on the side gears 22 and 24 tending to urge the side gears 22 and 24 into engagement with the clutch packs 34 and 36 to preload the clutch packs 34 and 36 so that said clutch packs are capable of transmitting a predetermined amount of torque from the case 12 to the shafts 26 and 28.

At this point it should be interesting to note that when a clearance "C" is utilized in a limited slip differential between the end of the axle shaft 26 or 28 and the pinion shaft 18, as shown in FIG. 1, the groove 30 or 32 should be wider than the sum of the clearance "C" and the thickness of the retention device 38 or 40 in order to allow the side gear 22 or 24 to always be biased into engagement with its respective clutch pack 34 or 36.

Figure 4:
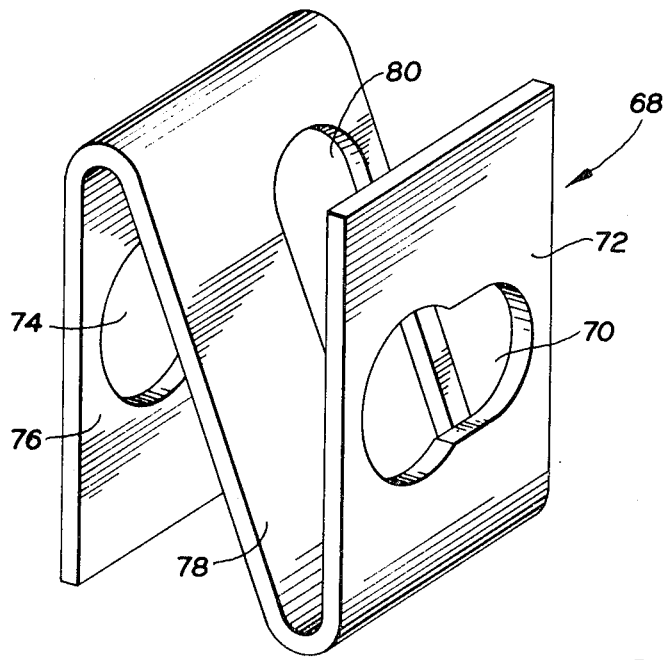
FIG. 4 is a perspective view of a second alternate embodiment of the present invention.

The retention devices 38 and 40 are shown in more detail in FIGS. 2, 3 and 4 wherein alternate species of the present invention are disclosed. In FIG. 2 one of the retention devices 38 of FIG. 1 is shown, the other retention device 40 in FIG. 1 being identical thereto. A detailed description will be given with respect only to the retention device 38.

The retention device 38 comprises a generally flat plate element 36 defining is keyhole opening 48 therein, one portion 50 of the keyhole opening 48 being of sufficiently large diameter as to permit the passage of one or the other of the respective shafts 26 or 28 therethrough while another portion 52 of the keyhole opening 48 has a slightly larger diameter than the base diameter of one of the grooves 30 or 32 of the shaft 26 and 28 respectively. A plurality of spring-retaining protrusions 54 are provided on the plate element 46 in order to properly position the springs 42 and 44. Means are provided in the form of lugs 51 and 53 having relieved portions 55 and 57 to engage the pinion shaft 18 when the retention device 38 or 40 is in assembled position within the differential case 12. The purpose of this means is to lock the retention device 38 or 40 into its assembled position. The purpose and operation of the retention device 38 of FIG. 2 will be more fully explained and described in combination with the differential 10 of FIG. 1 after a description of the alternative species of FIG. 3 and FIG. 4 have been given.

In FIG. 3 the retention devices 38 and 40 of FIG. 1 have been embodied in a unitary U-shaped member 56. The U-shaped member 56 has a pair of parallel legs 58 and 60. The legs 58 and 60 define keyhole openings 62 and 64 having portions of varying dimensions as described with respect to the element 38 of FIG. 2. In the species of FIG. 3 it is possible to provide spring retaining protrusions 66 and utilize springs similar to springs 42 and 44 of FIG. 1 in order to cause preloading of the clutch packs 34 and 36. With the species of FIG. 3, however, it is also possible to construct a member 66 of a material such that the member will have a high resiliency rate and the necessary biasing force may be obtained from the resiliency of the member without the need for additional springs or biasing means. Means are provided in the form of lugs 61 or 63 having end portions 65 or 67 for engaging an annular ring groove 69 (see FIG. 5) in a face of a side gear 71 which is adjacent the retention device 56 when the retention device 56 is assembled in the differential case 12 for maintaining the retainer 56 in the assembled position with respect to the axle shafts.

The species of FIG. 4 is essentially similar to that of FIG. 3 in that the force necessary to cause biasing of the clutch packs 34 and 36 may be obtained from the resiliency of the material. The retainer of FIG. 4 comprises a substantially Z-shaped member 68 having a keyhole opening 70 defined by one outer leg 72 and a second keyhole opening 74 in the other outer leg 76 of the member 68. The intermediate portion 78 of the member 68 defines a slot 80 through which the pinion shaft 18 may be passed when the Z-shaped member 68 is installed in the differential of FIG. 1. The width of the slot 80 is just slightly larger than the diameter of the pinion shaft 18, thereby preventing excessive movement of the retainer 68 when the pinion shaft 18 is in the assembled position within the slot 80. In the environment of a limited slip differential, the invention of the present application has considerable significance in improving and facilitating the assembly of the shafts 26 and 28 into the differential casing.

The invention of the present application permits the assembly of the differential 10 as shown in FIG. 1 except that the axle shafts 26 and 28 and pinion shaft 18 are not in place. The retention devices 38 and 40 are biased into the position of FIG. 1 by the springs 42 and 44. The shafts 26 and 28 are inserted into the differential case 12 through the clutch packs 34 and 36, through the side gears 22 and 24 and through the large portion 50 of the keyhole opening 48 in the retainers 38 and 40. With the shafts 26 and 28 so positioned, the retainers 38 and 40 are moved into the grooves 30 and 32 of the shafts 26 and 28. As the retainers 38 and 40 are moved transversely of the shafts, the portion 52 of the keyhole opening 48 slides over the base diameter of the grooves 30 and 32 thereby preventing withdrawal of the shafts 26 and 28 from the differential case 12. The biasing force of the springs 42 and 44 move the retainers 38 and 40 so that the side gears 22 and 24 are moved into engagement with the clutch packs 34 and 36 creating a bias between the differential case 12, the side gears 22 and 24, the clutch packs 34 and 36 through the retention means.

The pinion shaft 18 is then inserted to engage the relieved portions 55 and 57 respectively of the lugs 51 and 53 thus preventing subsequent movement of the retainer.

The species of FIGS. 3 and 4 are operable essentially in the same manner as described, excepting that it is possible to eliminate the separate biasing means in the form of the springs 42, 44, thus even further simplifying assembly of the axle shafts into the differential mechanism.

Having thus described my invention, I now claim:

1. A drive mechanism comprising:
 a rotatable casing having a plurality of openings therein;
 a pair of oppositely extending, coaxial, rotatable shafts extending through a pair of said openings in the casing and adapted to be driven thereby, the shafts terminating in end portions in spaced relationship within the casing and having a circumferential groove in the end portions; and
 a substantially U-shaped retention device having a pair of keyhole openings therein, first portions of said keyhole openings permitting passage of the shafts therethrough and second portions of said keyhole openings adapted to cooperate with said circumferential grooves in the shafts to prevent excessive axial movement of the shafts.

2. A drive mechanism comprising:
 a rotatable casing having a plurality of openings therein;
 a pair of oppositely extending, coaxial rotatable shafts extending through a pair of said openings in the casing and adapted to be rotatably driven thereby, the shafts terminating in end portions in spaced relationship within the casing and having a circumferential groove in said end portions; and
 a substantially Z-shaped retention device having a pair of keyhole openings therein, first portions of said keyhole openings permitting passage of the shafts therethrough and second portions of said keyhole openings adapted to cooperate with said circumferential grooves in the shafts to prevent excessive axial movement of the shafts.

3. An axle shaft retention device adapted to be used in a differential gear mechanism having a housing, axle shafts, and side gears on the axle shaft ends for imposing a predetermined outward bias on the side gears against rotation-retarding portions of the housing and for retaining the axle shaft ends within the housing, comprising
 members having substantially parallel surfaces adapted to engage the side gears,
 resiliently deformable means operatively engaging said members for biasing said members apart and adapted to impose predetermined bias on the side gears when the members are in engagement with the side gears, and
 said members having keyhole openings in said surfaces, one portion of each opening adapted to permit ends of the axle shafts to be inserted therethrough, and another portion of said openings adapted to cooperate with circumferential grooves in the shafts to retain the shaft ends therein.

4. A drive mechanism comprising:
 a rotatable casing having a plurality of openings therein;
 a pair of oppositely extending, coaxial rotatable shafts extending through a pair of said openings in the casing and adapted to be rotatably driven thereby, the shafts terminating in end portions in spaced relationship within the casing and having a circumferential groove in each of said end portions; and
 a retention device having keyhole openings therein, first portions of said keyhole openings permitting passage of the axle shafts therethrough and second portions of said keyhole openings adapted to cooperate with said circumferential grooves in the shafts to prevent excessive axial movement of the shafts,
 said drive mechanism further comprising a limited slip differential having a side gear mounted on each of said shafts for rotation therewith,
 a friction member interposed between said housing and at least one of said side gears and actuable to retard the rotation of said side gears and shafts with respect to said housing and wherein
 said retention device includes means for actuating said friction member.

5. A drive mechanism comprising:
 a rotatable casing having a plurality of openings therein;
 a pair of oppositely extending, coaxial rotatable shafts extending through a pair of said openings in the casing and adapted to be rotatably driven thereby, the shafts terminating in end portions in spaced relationship within the casing and having a circumferential groove in each of said end portions;
 a retention device having keyhole openings therein, first portions of said keyhole openings permitting passage of the axle shafts therethrough and second portions of said keyhole openings adapted to cooperate with said circumferential grooves in the shafts to prevent excessive axial movement of the shafts, and including means for maintaining said second portion of said keyhole opening in cooperating relationship to said groove in said shaft, said drive mechanism further comprising a limited slip differential having a side gear mounted on each of said shafts for rotation therewith, a friction member interposed between said housing and each of said side gears and actuable to control the rotation of said side gears and said shaft with respect to said housing and wherein said retention device includes means for actuating said friction member.

6. A limited slip differential mechanism comprising; a rotatable casing, a pair of shafts extending into the casing and mounted for driving engagement therewith and for rotation relative thereto, a friction member mounted on at least one of said shafts for rotation therewith, said friction member being positioned between a face of the casing and an end of the shaft, said friction member being actuable to engage said face of the casing to control the relative rotation of said shaft with respect to said casing and means providing a biasing force for actuating said friction member to engage said face and for preventing excessive axial movement of said shafts relative to said casing, and means comprising:

a unitary retainer formed of a spring plate material having two end portions and an intermediate portion, each of said end portions being configured to engage a groove in one of said shafts, and said intermediate portion being configured to utilize the spring properties of the material for providing the biasing force for actuating said friction member.

7. The drive mechanism as described in claim 5, wherein said retention device is made of a resilient material and said means for actuating said friction member comprises structure utilizing the resilient properties of the material to provide a biasing force for actuating said friction member.

* * * * *